CENTRIFUGAL CLASSIFIER

Original Filed April 18, 1967 2 Sheets-Sheet 1

INVENTOR.
CHARLES E. LAPPLE
BY
Merchant & Gould
ATTORNEYS

CENTRIFUGAL CLASSIFIER
Original Filed April 18, 1967 2 Sheets-Sheet 2
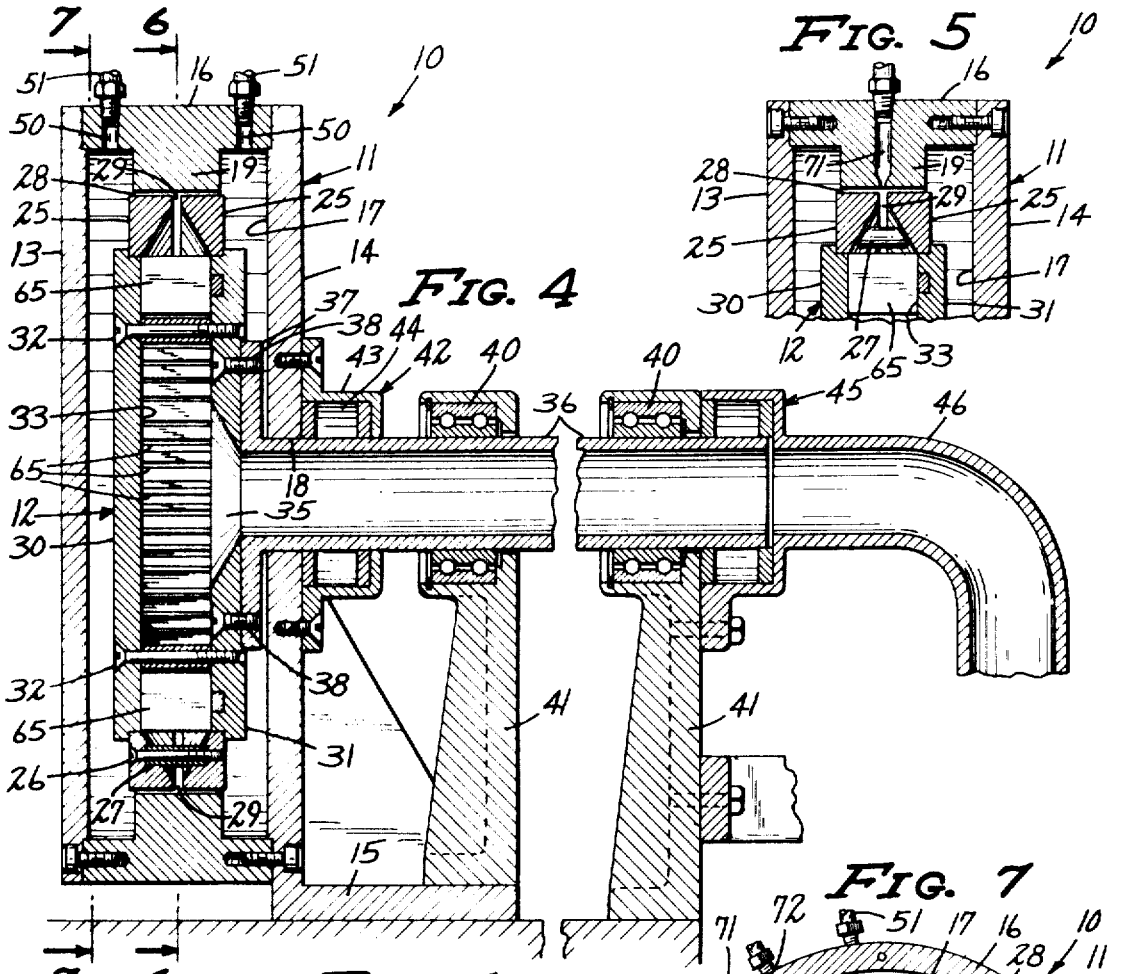
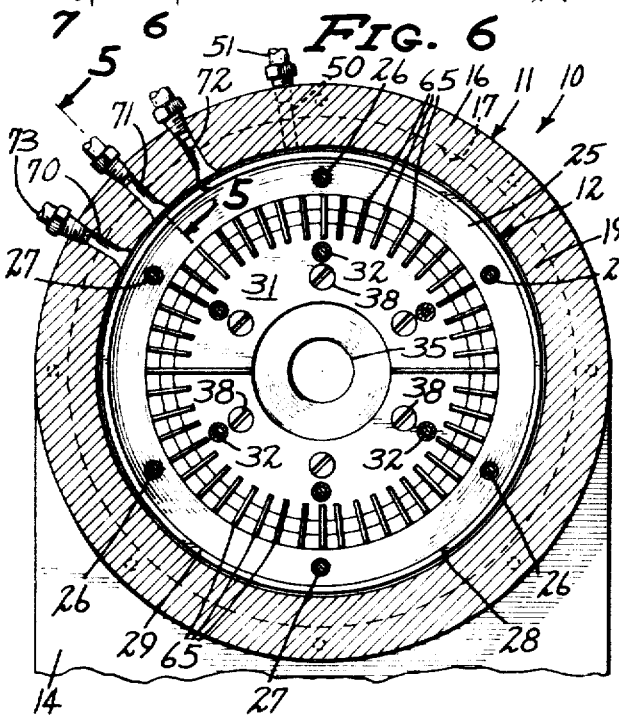
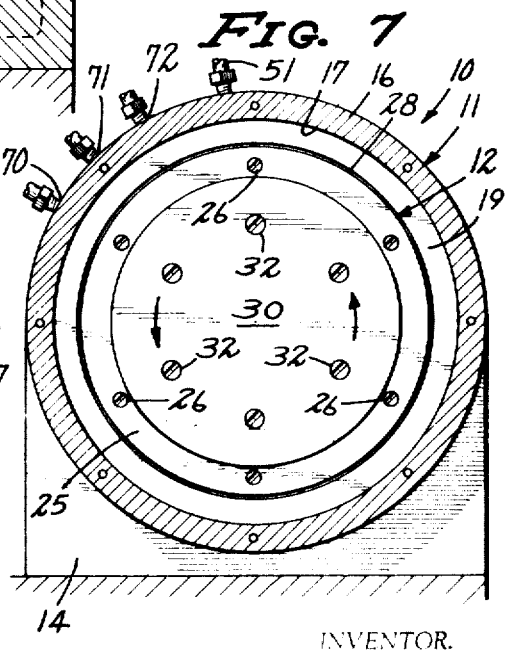
INVENTOR.
CHARLES E. LAPPLE
BY
Merchant & Gould
ATTORNEYS United States Patent Office Re. 27,742
Reissued Aug. 28, 1973

27,742
CENTRIFUGAL CLASSIFIER

Charles E. Lapple, Los Altos, Calif., assignor to Donaldson Company, Inc., Minneapolis, Minn.

Original No. 3,491,879, dated Jan. 27, 1970, Ser. No. 631,628, Apr. 18, 1967. Application for reissue Jan. 17, 1972, Ser. No. 218,566
Int. Cl. B07b *7/083*
U.S. Cl. 209—144 8 Claims

Matter enclosed in heavy brackets [ ] appears in the original patent but forms no part of this reissue specification; matter printed in italics indicates the additions made by reissue.

ABSTRACT OF THE DISCLOSURE

Apparatus for classifying particles of a powder according to size having a rotor and a stator separated by a narrow annular air gap. The rotor has a hollow coaxial chamber therein in communication with the air gap along the periphery of the rotor, and a central coaxial opening for the egress of an elutriating fluid and the fine fraction of the powder. The elutriating fluid under pressure is supplied to the chamber through the gap and a vortex is produced generally within the rotor in the flow of fluid by the rotation of the rotor. The powder to be classified is supplied to the vortex and the coarse fraction of the powder, which is forced toward the stator, is removed through a coarse fraction passageway while the fine fraction is removed with the fluid through the axial opening in the rotor.

BACKGROUND OF THE INVENTION

Field of the invention

Powders of various materials are utilized to an ever increasing extent in present day technology. In many of various industries that use powder, such as powdered metallurgy, magnetic tape, abrasives, pigments, etc., certain characteristics must be rigidly controlled. In such cases particles size is one of the most important properties of powders and govern such phenomena as flowability, packing density, and physical reactivity. For this reason, powders are ordinarily prepared to a given size specification by a process which is termed classification. Classification in general is the separation of a powder into a coarse fraction containing coarse particles, having a size somewhat larger than a cut size, and a fine fraction containing fine particles having a size equal to or less than the cut size. The cut size is equivalent to the separation point or the particular size of particles about which the powder is separated. Although there should be at least some particles having a size larger or coarser than cut size and at least some particles having a size smaller or finer than cut size, it is not necessary to actually have any particles with a size equal to the cut size in the powder. Particle size is usually expressed in terms of particle diameter. If particles are not spherical, an equivalent or apparent diameter may be used. One common method is to express size in terms of an equivalent spherical particle having the same settling velocity as the particle in question.

Description of the prior art

In most prior art centrifugal separators utilizing a rotor, the rotor is spinning within a chamber to form a vortex within the chamber and the powder is drawn into the vortex and the rotor at a continuous rate. The rotation of the rotor forces the larger particles toward the sides of the chamber while the fine particles are carried inwardly to a fine fraction outlet. The larger particles after reaching the sides of the chamber generally drop, through the force of gravity, into a coarse fraction outlet. At normally feasible industrial capacities, particle concentrations in the air are so high that it is virtually impossible to have all the particles dispersed as discrete particles at the same time during the entire classification. Because there is no dispersion of the particles prior to introduction thereof to the rotor, the particles have a tendency to form bunches or groups which, because of their size, are forced outwardly and egress through the coarse fraction outlet. Thus, fine particles pass into the coarse fraction with the coarse particles and the sharpness of separation is greatly reduced.

Although prior art centrifugal air separators are capable of separating fine powders into fine and coarse fractions, the sharpness of separation is usually not good. That is, the dividing line between the fine and the coarse fractions is not well defined and both groups will have some particles of the same size therein. This lack of sharpness of the separation in the centrifugal air separators becomes more pronounced as finer powders are processed. To provide sharpness of separation in the prior art centrifugal air separators, the powders must be processed many times. Also, in order to achieve a very small cut size at reasonable air flow rates, very high separating forces must be exerted on the particles. Such high forces are usually obtained in rotary centrifugal classifiers by high speeds of impeller rotation. Because of practical limitations of either equipment construction or power consumption, conventional air or gas separators are limited as to the smallest cut size that can be achieved with reasonable gas handling capacities.

SUMMARY OF THE INVENTION

This invention pertains to an improved particle classification device and more specifically to a centrifugal classifier in which the particles of the powder are subjected to successive dispersion during classification so that, in general, all particles are subjected to elutriation individually, at some time during the classification step, and the particles are subjected to a statistically uniform elutriation throughout the classification.

In the present device, a rotor is mounted for rotation approximately concentrically within an annular ring so that a small uniform gap is produced therebetween. The rotor is constructed with a chamber therein which extends radically outwardly to communicate with the gap at the periphery of the rotor. Also, the rotor has a coaxial opening therein for the egress of elutriating fluid and fine particles from the chamber in the rotor. Elutriating fluid, in this embodiment air, is supplied to the rotor in a manner to provide a flow through the gap to the coaxial opening in the rotor. Some means are supplied to rotate the rotor at a predetermined uniform speed so that the elutriating fluid is formed into a vortex as it flows from the gap to the coaxial opening. In the present embodiment fins or baffles are utilized to aid in forming a substantially forced vortex, however, it should be understood that the fins might be eliminated and a vortex would be formed in a manner well known to those skilled in the art. The powder to be classified is injected into the vortex and the coarse fraction is removed from the vortex at some point along the annular ring ahead of the powder injection point relative to the rotation of the rotor. Because the coarse fraction is removed from the vortex at a point spaced from the injection of the powder, the particles have a chance to disperse as discrete particles through successive dispersion as they rotate around the outer periphery of the chamber in the rotor. Since the particles are dispersed as discrete particles, the aerodynamic characteristics are directly related to the size of the particles. In air classifiers, the separation is determined in terms of the aerodynamic characteristics of the particles as they are suspended in the air stream and, consequently, the present air classifier separates the partices according to size. This successive dispersion and separation of the particles according to size greatly increases the sharpness of separation thereof. Also, because of the improved design of the rotor, the present classifier can efficiently and practically separate powders at cut sizes lower than previously practical.

It is an object of the present invention to provide a new and improved centrifugal classifier.

It is a further object of the present invention to provide a centrifugal classifier capable of separating powders with greatly increased sharpness.

It is a further object of the present invention to provide a centrifugal classifier capable of separating powders at greatly reduced cut sizes.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures;

FIGURE 4 is a sectional view thereof as seen from the line 4—4 of FIGURE 1 on an enlarged scale;

FIGURE 5 is an enlarged sectional view thereof as seen from the line 5—5 of FIGURE 6.

FIGURE 6 is a sectional view thereof as seen from the line 6—6 of FIGURE 4 on a reduced scale; and FIGURE 7 is a sectional view thereof as seen from the line 7—7 of FIGURE 4 on a still further reduced scale.

DESCRIPTION OF THE PREFERRED EMBODIMENT

Figure 1:
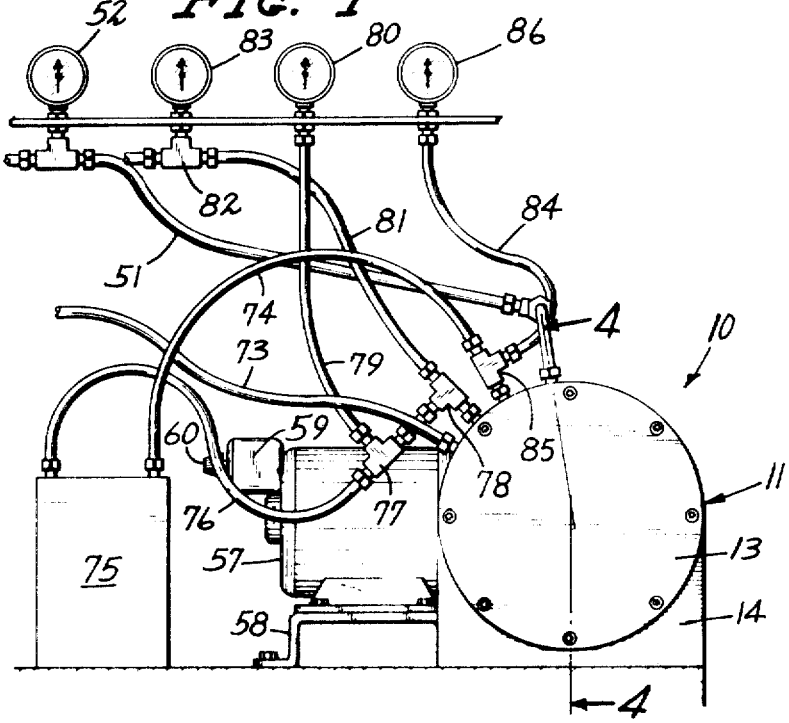
FIGURE 1 is an elevational view of a centrifugal classifier system constructed in accordance with the present invention.

The main body of the centrifugal classifier, generally designated 10, includes a housing 11 and a rotor 12. The housing 11 comprises a first flat circular plate 13, a second flat circular plate 14 having a horizontal base portion 15 fixedly attached thereto, and an annular ring 16 mounted between the two circular plates 13 and 14 to form a generally circular cavity 17. The circular plates 13 and 14 are connected to the annular ring 16 in any convenient manner, such as screws or the like, so that the cavity 17 is substantially air tight. The second circular plate 14 has a coaxial opening 18 therethrough. The annular ring 16 has a portion 19 which extends radially inwardy around the entire circumference of the annular ring 16 and has a transverse width somewhat shorter than the remainder of the annular ring 16.

The rotor 12 comprises a pair of similar annular rings 25 fixedly connected in an axially spaced apart relationship by a plurality of bolts 26 having spacers 27 therearound. The outer diameter of the annular ring 25 is slightly smaller than the inner diameter of the portion 19 of the annular ring 16 to form a gap 28 therebetween. The annular rings 25 are constructed with a generally triangularly shaped cross section, and they are fixed together so that the hypotenuses thereof converge toward the outer periphery. However, the extreme tips of the triangle are truncated with the adjacent tips forming radially extending sides which are maintained in a parallel spaced apart relationship by the spacers 27. The spaced apart sides of the annular rings 25 form a passageway 29 through which the inner opening formed between the annular rings 25 is in communication with the gap 28 around the entire periphery of the annular rings 25. Although the annular rings 25 are triangularly shaped in this embodiment, it should be understood that any shape which will provide the desired results might be utilized or in some instances they might be eliminated.

A first circular plate 30 and a second circular plate 31 each have an outer diameter slightly larger than the inner diameter of the annular rings 25. The circular plates 30 and 31 are clamped coaxially over the annular rings 25, by means of a plurality of screws 32, to form a hollow rotor 12 having an annular aperture or, as in this embodiment, a chamber 33 therein. Each of the circular plates 30 and 31 has an annular groove extending around the outer periphery thereof and adapted to receive the inner periphery of the annular rings 25 therein to render the chamber 33 substantially gas tight and to prevent movement between the circular plates 30 and 31 and the annular rings 25. It will be clear to those skilled in the art that the annular rings 25 can be eliminated as separate parts and formed integrally with the plates 30 and 31 if desired.

The second circular plate 31 in the rotor 12 has a coaxial opening 35 therein which is in communication with the coaxial chamber 33. A cylindrical conduit 36 having a radially outwardly extending flange 37 adjacent one end thereof, is fixedly connected to the second circular plate 31 coaxially therewith by means of a plurality of screws 38 threadedly engaged through the plate 31 and the flange 37. The inner diameter of the conduit 36 is approximately equal to the diameter of the opening 35 in the plate 31 so that a continuous passageway is formed. The conduit 36 extends axially outwardly from the rotor 12 through the opening 18 in the housing 11. Two bearing means 40 amount the conduit 36, and the attached rotor 12, for rotation about their horizontal axis. The bearing means 40 are mounted with the base portion 15 of the housing 11 by means of a pair of columns 41.

A shaft seal 42 is fixedly attached to the second circular plate 14 coaxial with the conduit 36 to maintain the cavity 17 in the housing 11 substantially free from the ingress and egress of air. The shaft seal 42 includes a member 43 having a generally cup-shaped configuration fixedly attached to the outer surface of the second circular plate 14 so as to form an annular cavity 44 surrounding the conduit 36 adjacent the outer surface of the second circular plate 14. Substantial quantities of the fluid which is utilized for elutriation in the rotor 12 are forced through the annular cavity 44 so that a strong current of elutriating fluid is always flowing from the annular cavity 44 inwardly toward the cavity 17 and outwardly into the atmosphere. Since the elutriating fluid is always flowing outwardly in both directions from the annular cavity 44, no solid particles can enter the cavity 17 in the housing 11 therethrough. A similar type of shaft seal, designated 45, is utilized at the outer end of the conduit 36 to connect that end to a nonrotating conduit 46. While the specific shaft seals 44 and 45 have been described in some detail, it should be understood that they do not form a part of this invention and any means which can provide the described functions will come within the scope of this invention. The nonrotating conduit 46 leads to a fine fraction accumulating means 47, illustrated in FIGURE 3, which will be described in more detail presently.

Two passageways 50 are provided in the annular ring 16, one of which is located on either side of the portion 19. The passageways 50 are adapted to receive an elutriating fluid, such as air, from a pressure source thereof. Although it should be understood that a variety of elutriating fluids might be utilized in the present apparatus, air is preferred in this embodiment and therefore, will be referred to as the elutriating fluid throughout the remainder of this specification. Also, in this embodiment pressurized air is utilized to produce a flow through the system, but it would be within the scope of this invention to use some other method to produce a pressure differential within the apparatus, such as vacuum producing means connected to conduit 46. An embodiment in which a vacuum producing means is connected to conduit 46 would not require an air tight cavity 17, that is the would not require an air tight cavity 17, that is the plates 13 and 14 would function only as supporting means for the annular ring 16. However, in this embodiment the accumulating means 47 would have to be enclosed.

In FIGURE 1, the passageways 50 are connected to one end of a conduit 51 and the other end is connected to a supply of pressurized air, not shown. A flow rate indicator 52 is interposed in the conduit 51 to indicate the flow rate of the air during operation of the centrifugal classifier. As air under pressure enters the passageways 50, the entire cavity 17 in the housing 11 is filled with pressurized air, which flows through the gap 28 into the passageway 29 from both sides of the rotor 12. In this embodiment, two passageways 50, one on either side of the rotor 12, are provided to supply air equally to both sides of the gap 28. The air flowing into the passageway 29 flows through the chamber 33 in the rotor 12 and out the opening 35 into the conduit 36. The air egressing through the conduit 36 passes into the conduit 46 and the fine fraction accumulating means 47 where it may be vented to the atmosphere or, in the case of a relatively expensive elutriating fluid, may be returned to the pressure source.

Figure 2:
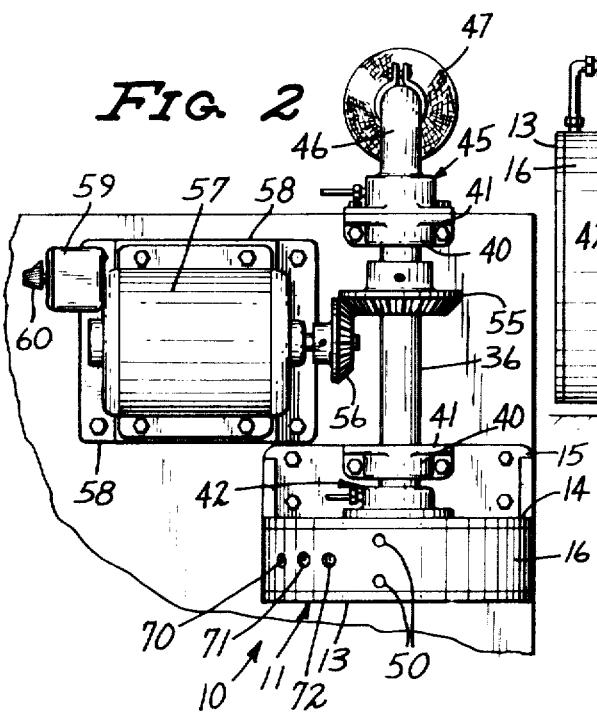
FIGURE 2 is a top plan view thereof.
Figure 3:
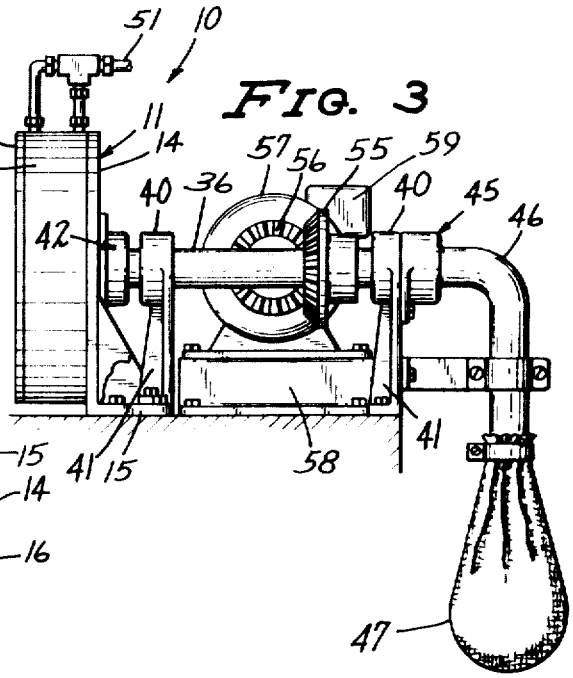
FIGURE 3 is a side elevational view as seen from right to left of FIGURE 1.

Referring to FIGURES 1 to 3, the means for rotating the rotor 12 can be seen. The conduit 36 has a driven bevel gear 55 fixedly attached thereto in a coaxial relationship. Bevel gear 55 meshes with a driving bevel gear 56 which is attached for rotation with the rotor of a motor 57. The motor 57 is mounted on a base 58 which is carried by and secured to a supporting surface. For the purpose of varying the speed of the motor 57, and thus the shaft 36 which it drives, there is provided a rheostat 59 operatively connected into the circuitry of the motor 57. Thus, the apparatus illustrated in FIGURES 1 through 3 provides means for rotating the rotor and for varying the speed of rotation thereof. It should be understood that the above described apparatus for rotating the rotor and varying the speed thereof is simply one device for accomplishing that purpose, and many others will be obvious to those skilled in the art. Any and all apparatus for rotating the rotor and varying the speed thereof come within the scope of this invention.

The rotor 12 has a plurality of radially extending fins 65 equally spaced about the axis with the inner ends spaced from the axis of the rotor 12. The outermost ends of the fins 65 are located at approximately the inner periphery of the annual rings 25. Thus, the fins 65 are spaced from the gap 28 approximately the radial dimension of the annular rings 25, and the opening between the annular rings 25 is free of any structure. Applying air to the passageways 50 fills the cavity 17 in the housing 11 and the air flows into the gap 28 from either side of the rotor 12 and then into the passageway 29. Energizing the motor 57 causes the rotor 12 to rotate at a predetermined speed, and the fins 65 in the chamber 33 of the rotor 12 produce a vortex at least a portion of which is in an area between the annular rings 25 and the ends of the fins 65. The air forming the vortex passes between the fins 65 and egresses through the conduit 36. The fins 65 are utilized in the preferred embodiment because the substantially forced vortex produced thereby provides more reliable control of classification. It will be understood by those skilled in the art, however, that the fins 65 might be eliminated and a vortex will be formed during the operation due to drag on the air by the rotating surfaces of the rotor.

Referring to FIGURES 5, 6, and 7, three passageway in the annular ring 16 of the housing 11 are illustrated. Referring to the passageways from left to right in FIGURE 6, the first passageway is a solids inlet passageway designated 70. The second passageway adjacent the solids inlet passageway 70, but spaced therefrom in a clockwise direction, is an air return passageway 71. The third passageway adjacent the air return passageway 71, but spaced therefrom in a clockwise direction, is a coarse fraction outlet passageway 72. Each of the passageways 70, 71, and 72 are positioned at approximately the transverse or axial center of the annular ring 16 in the housing 11. Thus, the outlets of each of the passageways 70, 71, and 72 are in the plane of the passageway 29 in the rotor 12, but spaced therefrom across the gap 28. In the present embodiment, the rotor 12 is adapted to turn in a counter clockwise direction, referring to FIGURE 6, so that the coarse fraction outlet passageway 72 is spaced forwardly of the solids inlet passageway 70 approximately 330 degrees with respect to the rotor 12 rotation, that is, 330 degrees in a counter clockwise direction. The solids inlet passageway 70 has a feed line 73 attached thereto for transporting solids, such as a powder to be classified, from a source to the solids inlet passageway 70 and into the vortex in the chamber 33 of the rotor 12. The vortex is formed at least partially in an elutriating zone in the chamber 33 between the annular ring 16 of the housing 11 and the outermost ends of the fins 65. The portion of the vortex in the elutriating zone separates the solids into a coarse fraction, which is forced outwardly toward the annular ring 16, and a fine fraction, which is carried inwardly with the air between the fins 65 and into the conduit 36. Rings 25 are shaped to provide a transition for the gas flow from the inner edge of gap 28 to the inner edge of the rotor plates 30 and 33. In the present embodiment (see especially FIG. 5) this is shown as a radially inwardly expanding passageway 29, resulting in a triangular cross-section for the rings 25. This passageway 29, however, could have any variety of shapes.

One end of a conduit 74 is attached to the coarse fraction outlet passageway 72 through a T-junction 85 and the other end is attached to the input of a coarse fraction accumulating means 75. The outlet of the coarse fraction accumulating means 75 is attached to one end of a conduit 76, the other end of which is connected to an arm of a T-junction 77. The opposite arm of T-junction 77 is connected to one arm of a T-junction 78 which has another arm connected to the air return passageway 71. The open arm of the T-junction 77 is connected through a conduit 79 to a flow rate indicator 80. The open arm of the T-junction 78 is connected through a conduit 81 to one arm of a T-junction 82 which has a flow rate indicator 83 connected in one arm, and a source of air under pressure connected into the other arm. Thus, the conduit 81 conducts air under pressure through the T-junction 78 which operates as an aspirator to draw air out of the coarse fraction accumulating means 75. As the air is drawn out of the coarse fraction accumulating means 75, air is drawn therein through the conduit 74 and the coarse fraction outlet passageway 72 from the passageway 29. Air from the pressure source in the conduit 81 and air drawn from the coarse fraction accumulaing means 75 returns to the passageway 29 through the air return passageway 71. Thus, a flow of air is provided into the coarse fraction accumulating means 75 which draws the coarse fraction from the passageway 29 through the coarse fraction outlet passageway 72 and into the coarse fraction accumulating means 75. A conduit 84 is connected to the coarse fraction outlet passageway 72 by means of the T-junction 85 and a flow rate indicator 86 is connected at the other end thereof so that the flow rate at the coarse fraction outlet passageway 72 can be compared to the flow rate at the air return passageway 71. By comparing the flow rates on the indicators 80 and 86, an operator can determine whether the coarse fraction outlet passageway 72 or the coarse fraction accumulating means 75 is operating correctly.

In the operation of this preferred embodiment of the centrifugal classifier, a source of air under pressure is supplied through the conduit 51 to the cavity 17 in the housing 11. This air passes into the gap 28 from either side of the rotor 12 and then into the chamber 33 through the passageway 29. The rotor 12 is rotated at a predetermined speed by the motor 57 and the fins 65 in the chamber 33 produce a vortex at least partially in an elutriation zone located in the chamber 33 radially outwardly from the outer most end of the fins 65. The air eventually passes through the fins 65, and out the conduits 36 and 46. The speed of the motor 57 is adjusted by rotating the rheostat control knob 60 of rheostat 59 to provide a desired rotary speed of the rotor 12 and separate any powders injected into the mechanism at a desired cut size. Powder is injected into the chamber 33 through the conduit 73, solids inlet passageway 70, gap 28, and passageway 29.

As the powders enter the chamber 33, they are dispersed by the air also entering the chamber 33 along the periphery of the rotor 12. The relatively narrow gap 28, between the rings 25 of the rotor 12 and the portion 19 of the housing 11 (see FIGS. 4 and 5) creates a relatively high air velocity. This relatively high velocity air acts on the powders as long as they remain in this area of the classifier to disperse the powders into discrete particles. The rotor motion also creates a tangential velocity component in and around the gap 29, and along the center inner edge of ring 19, resulting in a shear field that is also active in dispersing the powders. Because the coarse fraction outlet passageway 72 is located a substantial distance forwardly, relative to the direction of rotation of the rotor 12, of the solids inlet passageway 70 substantially of, the unclassified powders entering the solids inlet passageway 70 are eventually dispersed as discrete particles. The vortex then acts on each of the discrete particles according to size and the particles larger than cut size are forced outwardly, while the particles smaller than cut size are carried inwardly with the air. The large particles are carried through the coarse fraction outlet passageway 72 and accumulated in the coarse fraction accumulaitng means 75. The fine particles are carried with the air through the conduits 36 and 46, and are separated from the air in the fine fraction separating means 47. The fine fraction separating means 47 is illustrated simply as a filtering bag, but it should be understood that any convenient method of separating the fine particles from the air could be utilized.

Although this preferred embodiment only utilizes one solids inlet passageway 70 and one coarse fraction outlet passageway 72, it should be understood that a plurality of both passageways 70 and 72 might be utilized. Also, while an aspirating system is utilized to produce a flow in the coarse fraction outlet passageway 72, it should be understood that other methods might be utilized wherein a flow of air through the coarse fraction accumulating means 75 is not necessary. For example, the coarse fraction outlet passageway 72 might be slanted toward the direction of rotation of the rotor 12 so that the coarse particles are normally deflected therein.

While I have shown and described a specific embodiment of this invention, further modifications and improvements will occur to those skilled in the art. I desire it to be understood, therefore, that this invention is not limited to the particular form shown, and I intend in the appended claims to cover all modifications which do not depart from the spirit and scope of this invention.

What is claimed is:

1. A centrifugal classifier comprising:

(a) a housing having an opening therein defining a generally cylindrical inner wall;

(b) a rotor *having opposite sides and a periphery* mounted for rotation within the opening in said housing so as to form an annular gap between said rotor *periphery* and the inner wall, said rotor having an aperture therein in communication with said gap along substantially the entire periphery of said rotor;

(c) means for rotating said rotor at a desired speed to produce a vortex in an elutriation zone at least partially in said aperture adjacent the periphery of said rotor for separating solids in the elutriation zone into a coarse and fine fraction;

(d) fluid inlet passageway means in said housing *on both sides of the rotor*, positioned to supply an elutriating fluid to *both of* the axial outer [extremity] *extremities* of the annular gap for providing *oppositely directed flows* [a flow] of elutriating fluid through [to] the annular gap into the aperture in said rotor for the formation of the vortex produced by said rotor;

(e) an opening in said rotor in communication with said aperture through which the fluid and the fine fraction from the elutriation zone egresses;

(f) a solids inlet passageway in said cylindrical inner wall adapted to supply solids to be classified to the elutriation zone; and (g) a coarse fraction outlet passageway in said cylindrical inner wall of said housing in communication with said gap positioned forwardly of said solids inlet passageway relative to the direction of rotation of said rotor for receiving from the elutriation zone a coarse fraction of solids entering said solids inlet passageway.

[2. A centrifugal classifier as set forth in claim 1 having in addition a plurality of generally radially outwardly extending fins attached to the rotor within the aperture.]

3. A centrifugal classifier as set forth in claim 1 wherein the coarse fraction outlet passageway is connected to a coarse fraction collection system including aspirating mean for producing a flow of fluid and the coarse fraction from the aperture in the rotor, a fluid return passageway in communication with the gap between said rotor and the cylindrical inner wall and accumulating means in communication with said coarse fraction outlet passageway and said fluid return passageway for removing the coarse fraction from the fluid flowing therethrough.

[4. A centrifugal classifier as set forth in claim 1 including means for varying the rotational speed of the rotor to vary the cut size of the solids to be classified.]

5. A centrifugal classifier as set forth in claim 1 wherein the rotor is constructed of two side portions fixedly connected in a spaced apart relationship to form the aperture [therebetween] *and wherein the coarse fraction outlet passageway is positioned in the cylindrical inner wall of said housing at approximately the transverse center thereof so as to be located in the plane of the aperture between the two side portions and on the opposite side of the gap therefrom.*

[6. A centrifugal classifier as set forth in claim 5 wherein the coarse fraction outlet passageway is positioned in the cylindrical inner wall of said housing at approximately the transverse center thereof so as to be located in the plane of the aperture between the two side portions and on the opposite side of the gap therefrom.]

[7. A centrifugal classifier as set forth in claim 5 wherein the two side portions of the rotor are constructed so that the space therebetween adjacent the periphery is substantially reduced in size.]

8. A centrifugal classifier comprising:

(a) a housing having an opening therein defining a generally cylindrical inner wall;

(b) a rotor *having opposite sides and a periphery* mounted for rotation within the opening in said housing so as to form an annular gap between said rotor *periphery* and the inner wall, said rotor having an aperture therein extending radially outwardly into communication with said gap along substantially the entire periphery of said rotor, said rotor having attached thereto within said aperture a plurality of generally radially outwardly extending fins, the outer ends of which are spaced from the periphery of said rotor;

(c) fluid inlet passageway means in said housing *on both sides of the rotor,* positioned to supply an elutriating fluid to the axial outer extremity of the annular gap for providing [a flow] *oppositely directed flows* of elutriating fluid through the annular gap into the aperture in said rotor for the formation of the vortex produced by said rotor;

(d) an axial opening in said rotor in communication with said aperture through which the fluid egresses;

(e) means for supplying an elutriating fluid to said fluid inlet passageway and for causing said fluid to flow through said aperture and egress through said axial opening;

(f) means for rotating said rotor at a desired speed to produce a vortex, at least a portion of which vortex provides an elutriation zone between the inner wall of said housing and the outer ends of said fins;

(g) a solids inlet passageway in said cylindrical inner wall positioned to supply solids to be classified to the elutriation zone;

(h) a coarse fraction outlet passageway in said cylindrical inner wall of said housing in communication with said gap and positioned forwardly of said solids inlet passageway relative to the direction of rotation of said rotor for receiving a coarse fraction from the elutriation zone; and (i) means communicating with said opening in said rotor for receiving a fine fraction from the elutriation zone.

9. A centrifugal classifier comprising:

(a) a housing having an opening therein defining a general cylindrical inner wall;

(b) a rotor having *opposite sides, a periphery and* an axial width smaller than the axial width of the inner wall of said housing and mounted for rotation within said housing so as to form an annular gap therebetween relatively narrow as compared to the axial length thereof, said rotor having an aperture therein in communication with said gap along substantially the entire periphery of said rotor;

(c) means for rotating said rotor at a desired speed to produce a vortex in an elutriation zone in said aperture adjacent the periphery of said rotor for separating solids in the elutriation zone into a course and a fine fraction;

(d) fluid inlet passageway means in said housing *on both sides of the rotor,* positioned to supply an elutriating fluid to the axial outer extremity of the annular gap for providing [a flow] *oppositely directed flows* of elutriating fluid through the annular gap into the aperture in said rotor for the formation of the vortex produced by said rotor;

(e) axially extending conduit means fixedly attached to said rotor in communicating with said aperture through which the fluid and the fine fraction from the elutriation zone egresses, said conduit means extending outwardly through an opening in said housing;

(f) fine fraction accumulating means in communication with said conduit means for receiving the fine fraction;

(g) sealing means between said conduit means and said housing and between said conduit means and said fine fraction accumulating means for allowing relative rotation therebetween while preventing the egress of solids;

(h) a solids inlet passageway in said cylindrical wall for supplying solids to be classified to the elutriation zone; and (i) a course fraction outlet passageway in said cylindrical wall of said housing in communication with said gap positioned forwardly of said solids inlet passageway relative to the direction of rotation of said rotor for receiving from the elutriation zone the coarse fraction of solids entering said solids inlet passageway.

10. A centrifugal classifier as set forth in claim 9 wherein the fluid inlet passageway means includes an inlet passageway extending through the housing at both sides of the rotor and adjacent the periphery thereof.

*11. A centrifugal classifier comprising:*

*(a) a housing having an opening therein defining a generally cylindrical inner wall;*

*(b) a rotor having opposite sides and a periphery mounted for rotation within the opening in said housing so as to form an annular gap between said rotor periphery and the inner wall, said rotor having an aperture therein in communication with said gap along substantially the entire periphery of said rotor;*

*(c) means for rotating said rotor at a desired speed to produce a vortex in an elutriation zone at least partially in said aperture adjacent the periphery of said rotor for separating solids in the elutriation zone into a coarse and fine fraction;*

*(d) fluid inlet passageway means in said housing positioned to supply an elutriating fluid to the axial outer extremity of the annular gap from both sides of the rotor for providing oppositely directed flows of elutriating fluid through the annular gap into the aperture in said rotor for the formation of the vortex produced by said rotor;*

*(e) an opening in said rotor in communication with said aperture through which the fluid and the fine fraction from the elutriation zone egresses;*

*(f) means including a solids inlet passageway in said housing to supply solids to be classified to the elutriation zone; and*

*(g) a coarse fraction outlet passageway in said cylindrical inner wall of said housing in communication with said gap positioned forwardly of said solids inlet passageway relative to the direction of rotation of said rotor for receiving from the elutriation zone a coarse fraction of solids entering said solids inlet passageway.*

*12. Acentrifugal classifier comprising:*

*(a) a housing having an opening therein defining a generally cylindrical inner wall;*

*(b) a rotor having opposite sides and a periphery mounted for rotation within the opening in said housing so as to form a narrow annular gap between said rotor periphery and the inner wall, said rotor having an aperture therein extending radially outwardly between the opposite sides thereof into communication with said gap along substantially the entire periphery of said rotor;*

*(c) fluid inlet pasageway means in said housing positioned to supply an elutriating fluid to the axial outer extremity of the annular gap at both sides of the rotor for providing oppositely directed flows of elutriating fluid through the annular gap from both sides into the aperture in said rotor for the formation of the vortex produced by said rotor;*

*(d) an axial opening in said rotor in communication with said aperture through which the fluid egresses;*

*(e) means for supplying an elutriating fluid to said fluid inlet passageway and for causing said fluid to flow through said aperture and egress through said axial opening;*

*(f) means for rotating said rotor at a desired speed to produce a vortex, at least a portion of which vortex provides an elutriation zone in said aperture adjacent the periphery of said rotor;*

*(f) a solids inlet passageway in said housing positioned to supply solids to be classified to the elutriation zone;*

*(h) a coarse fraction outlet passageway in said cylindrical inner wall of said housing in communication*

*with said gap and positioned forwardly of said solids inlet passageway relative to the direction of rotation of said rotor for receiving a coarse fraction from the elutriation zone; and*

(*i*) *means communicating with said opening in said rotor for receiving a fine fraction from the elutriation zone.*

References Cited

The following references, cited by the Examiner, are of record in the patented file of this patent or the original patent.

UNITED STATES PATENTS

| | | | |
|---|---|---|---|
| 2,276,761 | 3/1942 | Carey | 209—145 X |
| 2,367,906 | 1/1945 | Wall | 209—144 |

| | | | |
|---|---|---|---|
| 2,739,709 | 3/1956 | Kaiser | 209—144 |
| 3,089,595 | 5/1963 | Kaiser | 209—144 |
| 3,269,537 | 8/1966 | Kaiser | 209—144 |

FOREIGN PATENTS

| | | | |
|---|---|---|---|
| 497,966 | 1/1939 | Great Britain | 209—144 |
| 694,219 | 7/1953 | Great Britain | 209—144 |
| 1,007,440 | 10/1965 | Great Britain | 209—144 |
| 647,888 | 5/1936 | Germany | 209—144 |

FRANK W. LUTTER, Primary Examiner

R. J. HILL, Assistant Examiner